(12) United States Patent
Iwabuchi

(10) Patent No.: US 9,380,528 B2
(45) Date of Patent: Jun. 28, 2016

(54) COMMUNICATION CONTROL METHOD AND BASE STATION

(75) Inventor: Akinori Iwabuchi, Machida (JP)

(73) Assignee: KYOCERA Corporation, Kyoto (JP)

( * ) Notice: Subject to any disclaimer, the term of this patent is extended or adjusted under 35 U.S.C. 154(b) by 88 days.

(21) Appl. No.: 14/130,424

(22) PCT Filed: Jul. 6, 2012

(86) PCT No.: PCT/JP2012/067399
§ 371 (c)(1),
(2), (4) Date: Dec. 31, 2013

(87) PCT Pub. No.: WO2013/008764
PCT Pub. Date: Jan. 17, 2013

(65) Prior Publication Data
US 2014/0171140 A1     Jun. 19, 2014

(30) Foreign Application Priority Data
Jul. 8, 2011   (JP) .................................. 2011-151592

(51) Int. Cl.
*H04W 52/02*   (2009.01)
*H04W 24/10*   (2009.01)
(Continued)

(52) U.S. Cl.
CPC .......... *H04W 52/0206* (2013.01); *H04W 24/10* (2013.01); *H04W 88/08* (2013.01); *H04W 92/20* (2013.01)

(58) Field of Classification Search
CPC ..... H04W 24/10; H04W 24/00; H04W 24/04; H04W 24/02; H04W 52/0206; H04W 52/00; H04W 52/02; H04W 52/04; H04W 28/00; H04W 88/00; H04W 88/08; H04W 88/12; H04W 92/20; H04W 92/22; H04W 92/24
USPC ........... 455/522, 69, 436, 561, 574, 424, 573, 455/11.1, 566, 552.1, 557, 437, 438, 572, 455/575; 345/428; 320/160, 132, 139, 141; 370/331; 324/430, 427, 429, 432
See application file for complete search history.

(56) References Cited

U.S. PATENT DOCUMENTS

| 2001/0005677 A1* | 6/2001 | Dempo ............. H04W 36/0055 455/436 |
| 2002/0128051 A1* | 9/2002 | Liebenow ......... H04M 1/72519 455/574 |

(Continued)

FOREIGN PATENT DOCUMENTS

| JP | 2008-042514 A | 2/2008 |
| WO | 2011/078045 A1 | 6/2011 |

OTHER PUBLICATIONS

International Search Report; PCT/JP2012/067399; Sep. 4, 2012.
(Continued)

*Primary Examiner* — Tan H Trinh
(74) *Attorney, Agent, or Firm* — Studebaker & Brackett PC

(57) ABSTRACT

A base station 10 is provided with a battery 12 and is capable of being driven by power supplied from the battery 12, comprises: a network communication unit 132 configured to transmit remaining power amount information indicating a remaining power amount of the battery 12 to another base station; and a communication control unit 171 configured to control the transmission of the remaining power amount information to the other base station in accordance with the remaining power amount of the battery.

6 Claims, 8 Drawing Sheets

(51) Int. Cl.
*H04W 88/08* (2009.01)
*H04W 92/20* (2009.01)

(56) References Cited

U.S. PATENT DOCUMENTS

| | | | | |
|---|---|---|---|---|
| 2004/0242286 A1* | 12/2004 | Benco | H04M 3/28 | 455/574 |
| 2005/0040959 A1* | 2/2005 | Moro | H04W 52/0261 | 340/636.15 |
| 2006/0288243 A1* | 12/2006 | Kim | G06F 1/3203 | 713/300 |
| 2007/0123303 A1* | 5/2007 | Book et al. | | 455/557 |
| 2008/0014997 A1* | 1/2008 | Guthrie et al. | | 455/572 |
| 2008/0045259 A1* | 2/2008 | Shen et al. | | 455/522 |
| 2008/0055311 A1* | 3/2008 | Aleksic et al. | | 345/428 |
| 2008/0107089 A1* | 5/2008 | Larsson | H04L 45/26 | 370/338 |
| 2008/0188177 A1* | 8/2008 | Tan et al. | | 455/11.1 |
| 2009/0027170 A1* | 1/2009 | Amir | G01S 13/87 | 340/10.31 |
| 2009/0196266 A1* | 8/2009 | Wu | H04W 24/02 | 370/338 |
| 2009/0197603 A1* | 8/2009 | Ji | H04W 36/0083 | 455/436 |
| 2009/0251309 A1* | 10/2009 | Yamasuge | H04B 5/02 | 340/539.3 |
| 2009/0252075 A1* | 10/2009 | Ji | H04W 56/00 | 370/312 |
| 2009/0270132 A1* | 10/2009 | Nakayama | | 455/561 |
| 2009/0278506 A1* | 11/2009 | Winger et al. | | 320/160 |
| 2010/0189075 A1* | 7/2010 | Iwamura | H04W 36/0055 | 370/331 |
| 2010/0190505 A1* | 7/2010 | Shiizaki | H04W 52/0261 | 455/452.1 |
| 2010/0273486 A1* | 10/2010 | Kharia et al. | | 455/436 |
| 2011/0021186 A1* | 1/2011 | Fischer | | 455/424 |
| 2013/0076124 A1* | 3/2013 | Yagura | B60L 1/04 | 307/9.1 |
| 2014/0087738 A1* | 3/2014 | Iwabuchi | | 455/437 |
| 2014/0106811 A1* | 4/2014 | Iwabuchi | | 455/522 |

OTHER PUBLICATIONS

3GPP TR 36.902 V9.1.0 (Mar. 2010), 3rd Generation Partnership Project; Technical Specification Group Radio Access Network; Evolved Universal Terrestrial Radio Access Network (E-UTRAN); Self-configuring and self-optimizing network (SON) use cases and solutions (Release 9), pp. 1-23.

* cited by examiner

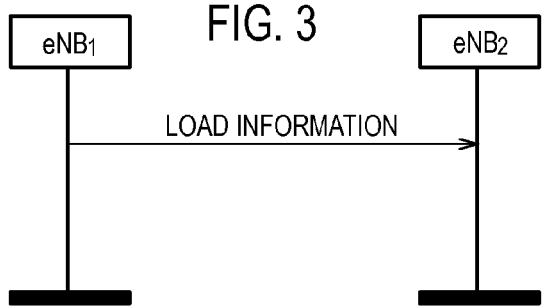

LOAD INFORMATION

| IE/GROUP NAME | PRESENCE | RANGE | IE TYPE AND REFERENCE | SEMANTICS DESCRIPTION |
|---|---|---|---|---|
| MESSAGE TYPE | M | | 9.2.13 | |
| CELL INFORMATION | M | | | |
| >CELL INFORMATION ITEM | | 1 TO maxCellineNB | | |
| >>CELL ID | M | | ECGI 9.2.14 | ID OF THE SOURCE CELL |
| >>UL INTERFERENCE OVERLOAD INDICATION | O | | 9.2.17 | |
| >>UL HIGH INTERFERENCE INFORMATION | | 0 TO maxCellineNB | | |
| >>>TARGET CELL ID | M | | ECGI 9.2.14 | ID OF THE CELL FOR WHICH THE HII IS MEANT |
| >>>UL HIGH INTERFERENCE INDICATION | M | | 9.2.18 | |
| >>RELATIVE NARROWBAND Tx POWER (RNTP) | O | | 9.2.19 | |
| >>ABS INFORMATION | O | | 9.2.54 | |
| >>INVOKE INDICATION | O | | 9.2.55 | |
| >> BATTERY INDICATION | O | | | |

FIG. 7

RESOURCE STATUS REQUEST

| IE/GROUP NAME | PRESENCE | IE TYPE AND REFERENCE | SEMANTICS DESCRIPTION |
|---|---|---|---|
| MESSAGE TYPE | M | 9.2.13 | |
| eNB$_1$ MEASUREMENT ID | M | INTEGER (1..4095,...) | ALLOCATED BY eNB$_1$ |
| eNB$_2$ MEASUREMENT ID | C-IFREGISTRATION REQUEST STOP | INTEGER (1..4095,...) | ALLOCATED BY eNB$_2$ |
| REGISTRATION REQUEST | M | ENUMERATED (START, STOP, ...) | A VALUE SET TO "STOP", INDICATES A REQUEST TO STOP ALL CELLS MEASUREMENTS. |
| REPORT CHARACTERISTICS | O | BITSTRING (SIZE(32)) | EACH POSITION IN THE BITMAP INDICATES MEASUREMENT OBJECT THE eNB$_2$ IS REQUESTED TO REPORT. FIRST BIT = PRB PERIODIC, SECOND BIT= TNL LOAD IND PERIODIC, THIRD BIT = HW LOAD IND PERIODIC, FOURTH BIT = COMPOSITE AVAILABLE CAPACITY PERIODIC, FIFTH BIT = ABS STATUS PERIODIC, SIXTH BIT = BATTERY STATUS PERIODIC, BITS 7 TO 32 SHALL BE IGNORED BY THE eNB$_2$ |
| CELL TO REPORT | | | CELL ID LIST FOR WHICH MEASUREMENT IS NEEDED |
| >CELL TO REPORT ITEM | | | |
| >>CELL ID | M | ECGI 9.2.14 | |
| REPORTING PERIODICITY | O | ENUMERATED (1000ms, 2000ms, 5000ms,10000ms, ...) | |
| PARTIAL SUCCESS INDICATOR | O | ENUMERATED (PARTIAL SUCCESS ALLOWED, ...) | INCLUDED IF PARTIAL SUCCESS IS ALLOWED. |

FIG. 8

RESOURCE STATUS UPDATE

| IE/GROUP NAME | PRESENCE | RANGE | IE TYPE AND REFERENCE |
|---|---|---|---|
| MESSAGE TYPE | M | | 9.2.13 |
| eNB1 MEASUREMENT ID | M | | INTEGER (1..4095,...) |
| eNB2 MEASUREMENT ID | M | | INTEGER (1..4095,...) |
| CELL MEASUREMENT RESULT | | 1 | |
| >CELL MEASUREMENT RESULT ITEM | | 1 to maxCellineNB | |
| >>CELL ID | M | | ECGI 9.2.14 |
| >>HARDWARE LOAD INDICATOR | O | | 9.2.34 |
| >>S1 TNL LOAD INDICATOR | O | | 9.2.35 |
| >>RADIO RESOURCE STATUS | O | | 9.2.37 |
| >>COMPOSITE AVAILABLE CapacityGroup | O | | 9.2.44 |
| >> ABS STATUS | O | | 9.2.58 |
| >> BATTERY STATUS | O | | |

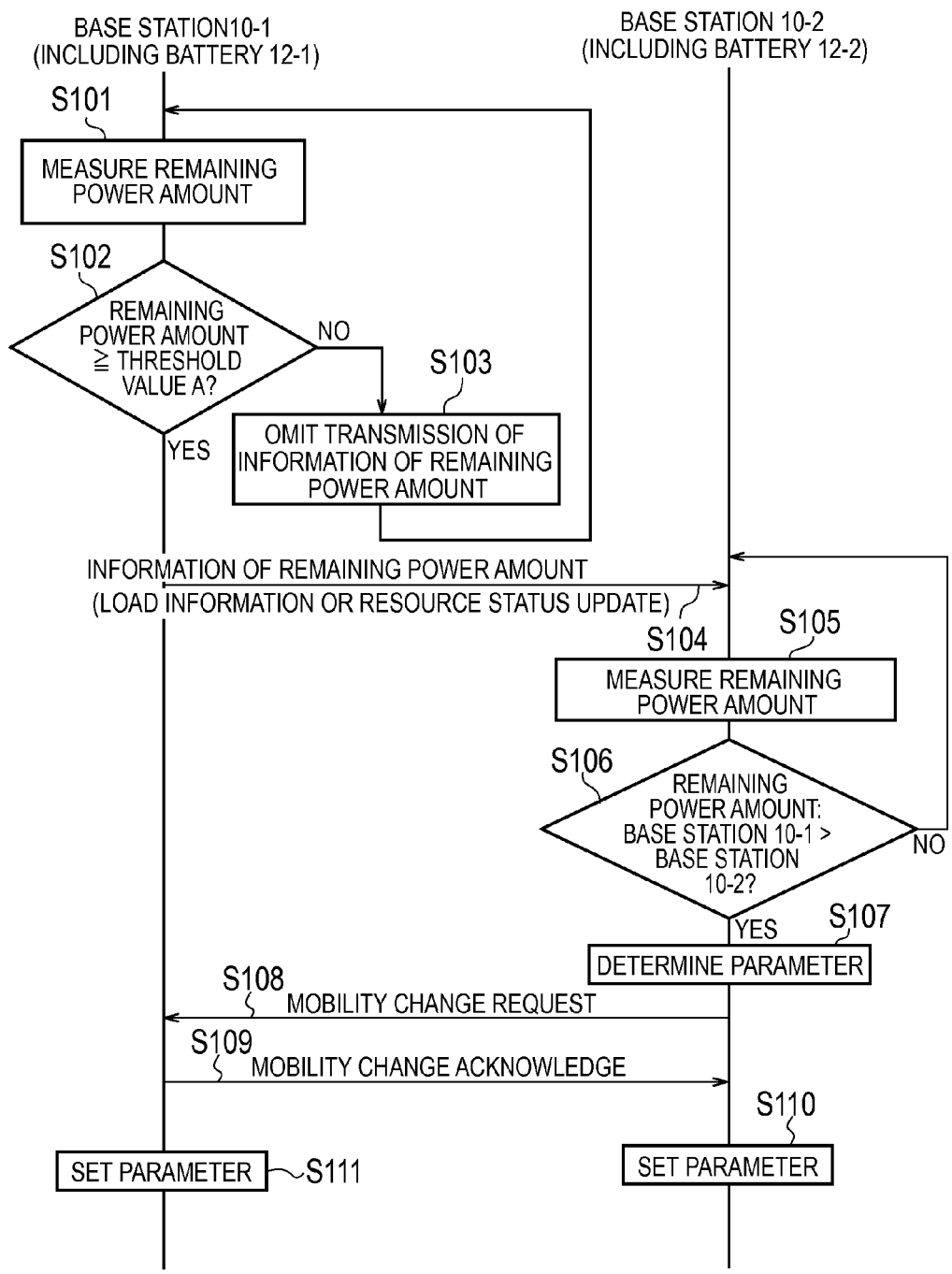

COMMUNICATION CONTROL METHOD AND BASE STATION

TECHNICAL FIELD

The present invention relates to a communication control method and a base station in a mobile communication system that supports a SON technology.

BACKGROUND ART

In LTE (Long Term Evolution) standardized in 3GPP (3rd Generation Partnership Project) which is a project aiming to standardize a mobile communication system, a technology called SON (Self Organizing Network) is employed.

The SON technology automatically optimizes settings of a base station without requiring a manual operation during the operation of the base station, (see, for example, Non Patent Literature 1).

As a kind of the SON technologies, there is a technology called MLB (Mobility Load Balancing) which distributes (levels) loads among a plurality of base stations by adjusting coverage of respective base stations, when load deflection exists among the plurality of base stations.

CITATION LIST

Non Patent Literature

Non Patent Literature: 3GPP Technical Report "TR 36.902 V9.1.0" March 2010

SUMMARY OF THE INVENTION

However, in the SON technology defined by the 3GPP standards, power circumstance that is represented by a recent massive blackout and the like is not taken into account. Therefore, there is a problem in which it is not possible to perform load distribution control among base stations with taking into account such power circumstance.

Therefore, the purpose of the present invention is to solve the aforementioned problem in the mobile communication system that supports a SON technology.

In order to solve the aforementioned problem, the present invention has following features.

The feature of a communication control method according to the present invention is summarized as follows. A communication control method in a mobile communication system (mobile communication system 1) that includes a base station (base station 10-1) that is provided with a battery (battery 12-1) and that is capable of being driven by power supplied from the battery, comprises: a transmission control step of controlling, by the base station, transmission of remaining power amount information from the base station to another base station (base station 10-2), wherein the remaining power amount information indicates a remaining power amount of the battery, and the transmission control step controls the transmission of the remaining power amount information from the base station to the other base station in accordance with the remaining power amount of the battery.

According to such a feature, it is possible to appropriately transmit the remaining power amount information by controlling the transmission of the remaining power amount information from the base station to the other base station in accordance with the remaining power amount of the battery provided in the base station.

In the aforementioned feature, another feature of a communication control method according to the present invention is summarized as follows. The transmission control step comprises: a step of controlling so as to transmit the remaining power amount information to the other base station when the remaining power amount of the battery is equal to or more than a first threshold value; and a step of controlling so as not to transmit the remaining power amount information to the other base station when the remaining power amount of the battery is less than the first threshold value.

According to such a feature, when the remaining power amount of the battery provided in the base station is equal to or more than the first threshold value (that is, when the remaining power amount of the battery is large), it is possible to prompt the redirection of a load of the other base station to the base station by transmitting the remaining power amount information from the base station to the other base station. Therefore, it is effective for the case in which, for example, the remaining power amount of a battery provided in the other base station is estimated to be small.

On the other hand, the base station does not have enough margin to absorb the load of the other base station when the remaining power amount of the battery provided in the base station is less than the first threshold value (that is, the remaining power amount of the battery is small). Therefore, it is possible to prevent signaling between the base stations (traffic between the base stations) by not transmitting the remaining power amount information to the other base station.

In the aforementioned feature, another feature of a communication control method according to the present invention is summarized as follows. The communication control method further comprises: a reception step of receiving, by the other base station, the remaining power amount information from the base station; and a load adjustment step of performing, by the other base station, a process for increasing a load of the base station and for decreasing a load of the other base station when a remaining power amount of a battery (battery 12-2) provided in the other base station is less than the remaining power amount indicated by the remaining power amount information received in the reception step.

According to such a feature, when the remaining power amount of the battery provided in the other base station is smaller than the remaining power amount of the battery provided in the base station, it is possible to redirect the load of the other base station to the base station. As a result, it is possible to reduce power consumption of the other base station, and thus, it is possible to prevent a problem, in which communication is disabled by a deficit of the remaining power amount of the battery provided in the other base station.

In the aforementioned feature, another feature of a communication control method according to the present invention is summarized as follows. The transmission control step comprises: a step of controlling so as to transmit the remaining power amount information to the other base station when the remaining power amount of the battery is less than a second threshold value; and a step of controlling so as not to transmit the remaining power amount information to the other base station when the remaining power amount of the battery is equal to or more than the second threshold value.

According to such a feature, when the remaining power amount of the battery provided in the base station is less than the second threshold value (that is, when the remaining power amount of the battery is small), it is possible to prompt the redirection of a load of the base station to the other base station by transmitting the remaining power amount information from the base station to the other base station. Therefore, it is effective for the case in which, for example, the remaining power amount of the battery provided in the other base station is estimated to be large.

On the other hand, the necessity for the other base station to absorb the load of the base station is low when the remaining power amount of the battery provided in the base station is equal to or more than the second threshold value (that is, the remaining power amount of the battery is large). Therefore, it is possible to prevent signaling between the base stations (traffic between the base stations) by not transmitting the remaining power amount information to the other base station.

In the aforementioned feature, another feature of a communication control method according to the present invention is summarized as follows. The communication control method further comprises: a reception step of receiving, by the other base station, the remaining power amount information from the base station; and a load adjustment step of performing, by the other base station, a process for decreasing a load of the base station and for increasing a load of the other base station when a remaining power amount of a battery (battery 12-2) provided in the other base station is more than the remaining power amount indicated by the remaining power amount information received in the reception step.

According to such a feature, when the remaining power amount of the battery provided in the other base station is larger than the remaining power amount of the battery provided in the base station, it is possible to redirect the load of the base station to the other base station. As a result, it is possible to reduce power consumption of the base station, and thus, it is possible to prevent a problem, in which communication is disabled by a deficit of the remaining power amount of the battery provided in the base station, from occurring.

The feature of a base station according to the present invention is summarized as follows. A base station (base station 10) that is provided with a battery (battery 12) and capable of being driven by power supplied from the battery, comprises: a transmission unit (network communication unit 132) configured to transmit remaining power amount information indicating a remaining power amount of the battery to another base station; and a control unit (communication control unit 171) configured to control the transmission of the remaining power amount information to the other base station in accordance with the remaining power amount of the battery.

BRIEF DESCRIPTION OF THE DRAWINGS

FIG. 3 is a sequence diagram for explaining a message configuration example 1 according to the first embodiment and the second embodiment.

FIG. 4 is a diagram for explaining IEs of the LOAD INFORMATION message according to the first embodiment and the second embodiment.

FIG. 7 is a diagram for explaining IEs of the RESOURCE STATUS REQUEST message according to the first embodiment and the second embodiment.

FIG. 8 is a diagram for explaining IEs of the RESOURCE STATUS UPDATE message according to the first embodiment and the second embodiment.

FIG. 9 is an operation sequence diagram of the mobile communication system according to the first embodiment.

DESCRIPTION OF THE EMBODIMENTS

Figure 1:
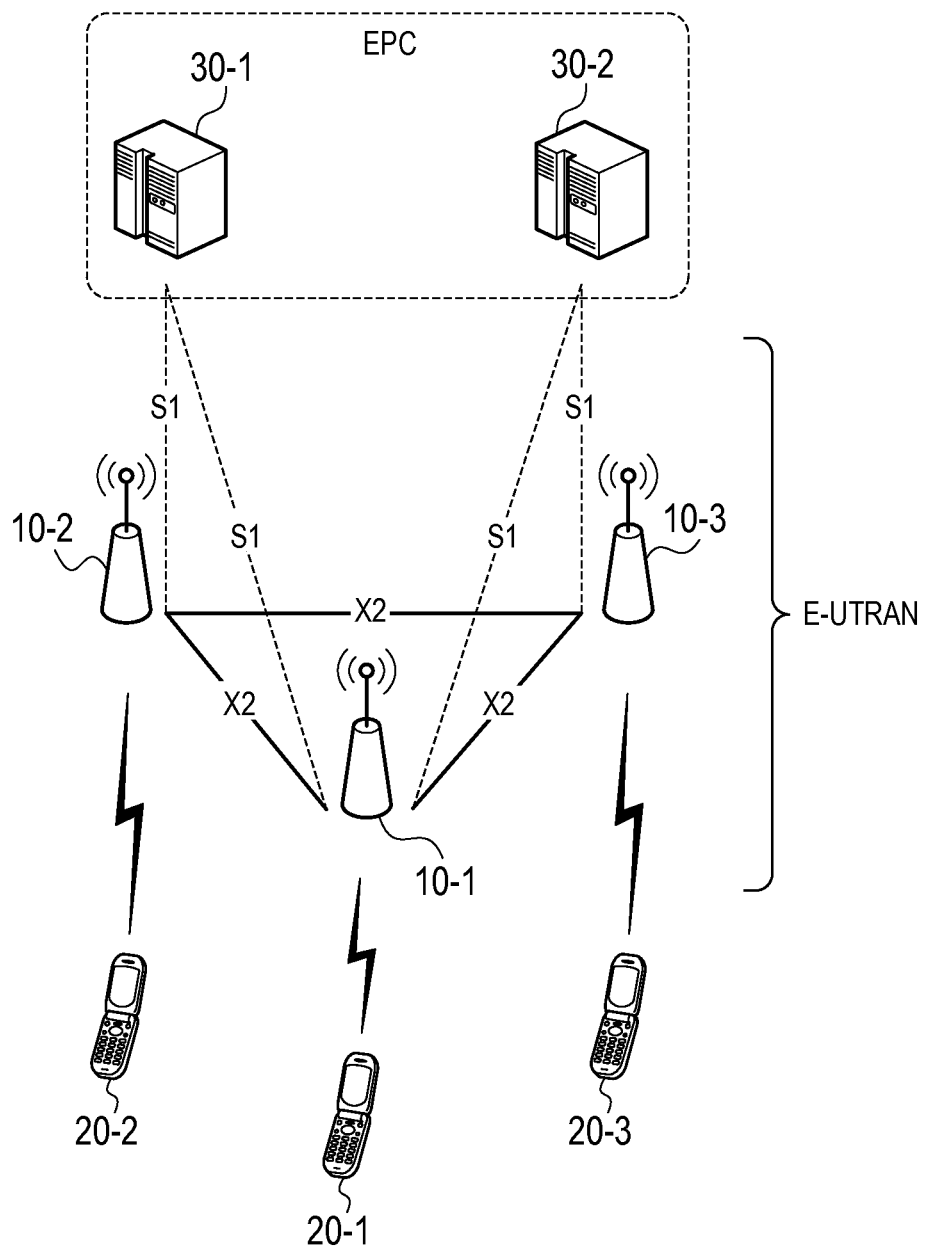
FIG. 1 is a diagram showing an entire configuration of a mobile communication system according to the first embodiment and the second embodiment.

With reference to the drawings, the first embodiment, the second embodiment and the other embodiment of the present invention will be described. In the drawings of each embodiment described below, the same or similar reference signs are applied to the same or similar portions.

(1) First Embodiment (1.1) Entire Configuration of System

FIG. 1 is a diagram showing an entire configuration of a mobile communication system 1 according to the present embodiment. The mobile communication system 1 is configured on the basis of LTE (3GPP Release 8 and 9) or LTE Advanced (after 3GPP Release 10).

As illustrated in FIG. 1, the mobile communication system includes E-UTRAN (Evolved-UMTS Terrestrial Radio Access Network) which is a radio access network. The E-UTRAN includes a plurality of base stations (eNBs; evolved Nodes B) 10.

Each of the plurality of base stations 10 is capable of being driven by power from a system. The details will be described later, however, each of the base stations 10 is configured to include a battery, and to be capable of being driven by power accumulated in the battery (stand-alone operation) even if power supply from the system is stopped (that is, blackout).

Further, each of the plurality of base stations 10 forms one cell or a plurality of cells. Here, the cell is a minimum unit of a radio communication area where a radio terminal (UE; User Equipment) 20 can communicate.

A radio terminal 20-1 camps on a cell formed by a base station 10-1, and communicates with the base station 10-1. A radio terminal 20-2 camps on a cell formed by a base station 10-2, and communicates with the base station 10-2. A radio terminal 20-3 camps on a cell formed by a base station 10-3, and communicates with the base station 10-3.

The radio terminal 20 performs switching to a base station having a better radio condition along with movement, for example. Such base station switching is called handover in a connection state, and is called cell reselection in an idle state. In the present mobile communication system, a base station to which the radio terminal 20 connects has authority as to whether to perform handover of the radio terminal 20 and authority of a handover destination.

The mobile communication system 1 supports an MLB (Mobility Load Balancing) technology which is a kind of SON technologies, and is configured to be capable of adjusting a cell range (coverage) on the basis of load information transmitted and received among the base stations in order to level loads among the base stations.

In the mobile communication system 1, an X2 interface for mutually connecting the base stations 10 (adjacent to each other) is set. The base station 10 is configured to perform communication between base stations, that is, communicate with another base station 10 adjacent to the base station 10 by using the X2 interface.

Furthermore, the mobile communication system 1 includes EPC (Evolved Packet Core) which is a core network.

The EPC includes a plurality of mobility management devices (MME; Mobility Management Entity)/gateway devices (S-GW; Serving Gateway) 30. The mobility management device is configured to perform various types of mobility control on the radio terminal 20. The gateway device is configured to perform transfer control of user data transmitted and received by the radio terminal 20.

An S1 interface for connecting each of the base stations 10 to the EPC is set between the base station 10 and the EPC. The base station 10 is configured to communicate with the EPC by using the S1 interface.

(1.2) Configuration of Base Station

Figure 2:
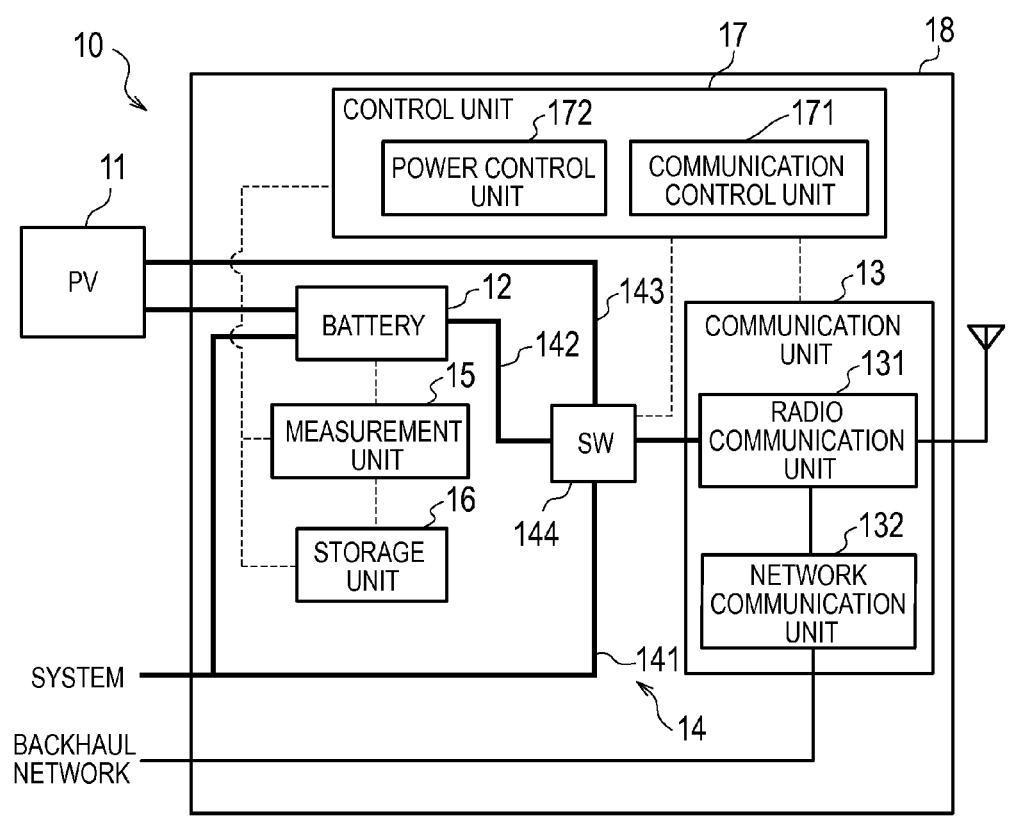
FIG. 2 is a block diagram of a base station according to the first embodiment and the second embodiment.

Next, a configuration of the base station 10 is explained. FIG. 2 is a block diagram of the base station 10. In FIG. 2, a thick line between each block represents a power line, a thin line represents a communication signal line, and a broken line represents a control signal line. Moreover, the system indicates a distribution system of an electric power company, and a backhaul network indicates a communication infrastructure network constructed by a communication carrier.

As illustrated in FIG. 2, the base station 10 includes a photovoltaic power generation device (hereinafter, referred to as PV) 11, a battery 12, a communication unit 13, a power transmission means 14, a measurement unit 15, a storage unit 16, and a control unit 17. In the present embodiment, the battery 12, the communication unit 13, the power transmission means 14, the measurement unit 15, the storage unit 16, and the control unit 17 are provided in a base-station main body (a case body) 18.

The PV 11 receives sunlight to generate electricity, and outputs power obtained by generating the electricity. In the present embodiment, the PV 11 is separated from the base-station main body 18, but may be integrally formed with the base-station main body 18.

In the present embodiment, a configuration where the base station 10 is provided with the PV 11 will be mainly described; however, the base station 10 may not be necessarily provided with the PV 11.

The communication unit 13 includes a radio communication unit 131 for performing radio communication with the radio terminal 20, and a network communication unit 132 for performing communication with the network side (the EPC or another base station).

The battery 12 accumulates the power generated in the PV 11 and the power from the system, and discharges the accumulated power under the control of the control unit 17. The battery 12 is, for example, a lithium-based battery, but may be a recyclable battery used in an electric vehicle. In the base station not including the PV 11, the battery 12 may be a type of a UPS (Uninterruptible Power Supply) system that accumulates the power from the system.

The power transmission means 14 includes a path (a first path) 141 for transmitting the power from the system to each block of the base station 10, a path (a second path) 142 for transmitting the power from the battery 12 thereto, a path (a third path) 143 for transmitting the power from the PV thereto, and a switch (hereinafter, referred to as SW) 144 for selectively switching the respective paths.

In FIG. 2, although the paths for transmitting the power from the SW 144 to the communication unit 13 are illustrated, respective paths for transmitting the power from the SW 144 to other blocks (for example, the control unit 17) may be also provided actually.

The measurement unit 15 measures the power accumulated in the battery 12 (hereinafter, referred to as a remaining power amount) under the control of the control unit 17. The measurement unit 15 outputs the measurement result to the storage unit 16 when measuring the remaining power amount.

The storage unit 16 stores various types of information to be used for the control by the control unit 17. In the present embodiment, the storage unit 16 stores the measured result of the remaining power amount by the measurement unit 15.

The control unit 17 controls various functions of the base station 10. In the present embodiment, the control unit 17 includes a communication control unit 171 and a power control unit 172.

The communication control unit 171 controls the communication unit 13. Specifically, the communication control unit 171 controls radio communication (communication by the radio communication unit 131) with the radio terminal 20 and communication (communication by the network communication unit 132) using the X2 interface and the S1 interface.

In the present embodiment, the communication control unit 171 acquires the remaining power amount of the battery 12 from the storage unit 16 and compares the remaining power amount of the battery 12 with a threshold value A. The threshold value A is a value equal to or slightly lower than an upper limit value indicating an overcharge of the battery 12, and is stored in the storage unit 16 in advance.

When the remaining power amount of the battery 12 is equal to or more than the threshold value A, the communication control unit 171 controls the network communication unit 132 to transmit remaining power amount information indicating the remaining power amount of the battery 12 to another base station. The remaining power amount information may be a value of the remaining power amount of the battery 12 (wattage (W)), or may be an index (for example, Full: "11", Middle: "10", Low: "01", and Empty: "00") indicating a level of the remaining power amount of the battery 12.

On the other hand, when the remaining power amount of the battery 12 is less than the threshold value A, the communication control unit 171 controls the network communication unit 132 not to transmit the remaining power amount information to the other base station.

In this way, in the present embodiment, the network communication unit 132 corresponds to a transmission unit configured to transmit the remaining power amount information. In the present embodiment, the communication control unit 171 corresponds to a control unit configured to control the transmission of the remaining power amount information to another base station in accordance with the remaining power amount of the battery 12.

When the network communication unit 132 receives the remaining power amount information from the other base station, the communication control unit 171 controls so as to adjust a load of the base station and/or a load of the other base station on the basis of the received remaining power amount information.

In the present embodiment, when it is determined that the remaining power amount of the base station is less than the remaining power amount of the other base station, as a result of the comparison of the remaining power amount of the other base station with the remaining power amount of the base station, the communication control unit 171 performs a process for increasing the load of the other base station and for decreasing the load of the base station. Specifically, the communication control unit 171 performs load distribution control so that the other base station accommodates the radio terminal 20 to be accommodated by the base station. For example, the communication control unit 171 performs a handover process so as to give preference to the other base station over the base station as the handover destination, or adjusts a hand over parameter. Alternatively, the communication control unit 171 may adjust a cell reselection parameter so as to give preference to the other base station as a standby destination.

The power control unit 172 controls the SW 144 and the battery 12. The power control unit 172 controls the SW 144 to supply the power from the battery 12 to each block. When the base station 10 is provided with the PV 11, the power control unit 172 controls so as to supply the power not only from the battery 12 but also from the PV 11. In this case, as to discharge control of the battery 12, the power control unit 172 preferably controls such that a deficit of the generated power by the PV 11 is covered by the battery 12 on the basis of time zone or weather information, for example.

The power control unit 172 controls the measurement unit 15 to start the measurement of the remaining power amount of the battery 12. For example, the measurement is periodically performed (for example, every 20 msec. to several minutes).

The power control unit 172 controls the storage unit 16. The power control unit 172 stores the measured result of the remaining power amount in the storage unit 16. The power control unit 172 updates the remaining power amount information stored in the storage unit 16 whenever the measurement is performed. As described above, the remaining power amount information stored in the storage unit 16 is used by the communication control unit 171.

The power control unit 172 determines a charge and discharge schedule of the battery 12 and a power supply schedule to each block of the base station 10. For example, in the case of the base station 10 driven by the power from the PV 11, the battery 12, and the system, the power control unit 172 controls so as to charge power of night time zone which is cheaper than power price of daytime zone in the battery 12, and to drive the base station 10 by the power accumulated in the battery 12 after, for example, 7 a.m. At this time, the power control unit 172 controls the base station 10 to appropriately consume the power generated in the PV 11. Furthermore, when there are deficits in the power from the battery 12 and the PV 11, the power control unit 172 controls so as to drive the base station 10 by the power from the system urgently. In the case of such a base station 10, the battery 12 becomes one of main power sources.

(1.3) Configuration of Message

Next, a configuration of a message to be transmitted and received between the base stations 10 will be described.

(1.3.1) Message Configuration Example 1

FIG. 3 is a sequence diagram for explaining a message configuration example 1. In FIG. 3, one of the base stations 10 adjacent to each other is denoted by eNB 1, and the other is denoted by eNB 2.

As illustrated in FIG. 3, the eNB 1 transmits the remaining power amount information in a LOAD INFORMATION message to the eNB 2 by using the X2 interface. The eNB 2 receives the LOAD INFORMATION message including the remaining power amount information by using the X2 interface.

FIG. 4 is a diagram for explaining information elements (IEs) of the LOAD INFORMATION message. Except for an underlined part of FIG. 4, the IEs are the same as those of the LOAD INFORMATION message defined by the 3GPP standards (see, for example, 3GPP TS 36.423 V10.1.0 "9.1.2.1 LOAD INFORMATION").

As illustrated in FIG. 4, the LOAD INFORMATION message includes a Battery Indication IE as the remaining power amount information in addition to IEs of a current LOAD INFORMATION message.

The LOAD INFORMATION message includes IDs of cells (source cells) of a transmission source of this message, and is transmitted for each source cell. Thus, when one base station forms a plurality of cells and a different battery 12 is provided in each of the plurality of cells, it is possible to transmit a different Battery Indication IE for each source cell.

In addition, the LOAD INFORMATION message may include each IE (UL Interference Overload Indication, UL High Interference Information, and Relative Narrowband Tx Power, for example) for interference control between base stations, in addition to the Battery Indication IE indicating the remaining power amount.

(1.3.2) Message Configuration Example 2

Figure 5:
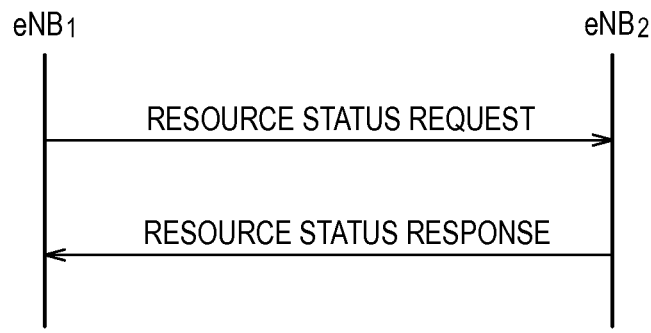
FIG. 5 is a sequence diagram for explaining a message configuration example 2 according to the first embodiment and the second embodiment (part 1).
Figure 6:
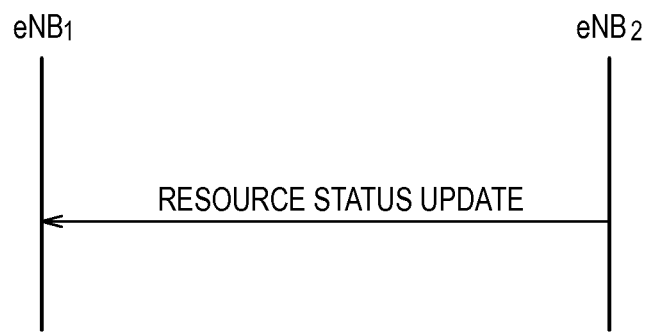
FIG. 6 is a sequence diagram for explaining a message configuration example 2 according to the first embodiment and the second embodiment (part 2).

FIG. 5 and FIG. 6 are sequence diagrams for explaining a message configuration example 2. In FIG. 5 and FIG. 6, one of the base stations 10 adjacent to each other is denoted by eNB 1, and the other is denoted by eNB 2.

As illustrated in FIG. 5, the eNB 1 transmits a RESOURCE STATUS REQUEST message including a transmission request (remaining power amount request) of the remaining power amount information, to the eNB 2 by using the X2 interface. The eNB 2 receives the RESOURCE STATUS REQUEST message including the remaining power amount request by using the X2 interface.

The eNB 2 transmits a RESOURCE STATUS RESPONSE message which is a positive response to the RESOURCE STATUS REQUEST message, to the eNB 1 by using the X2 interface. The eNB 1 receives the RESOURCE STATUS RESPONSE message by using the X2 interface.

The RESOURCE STATUS REQUEST message is configured to be able to designate one entry or a plurality of entries from among a plurality of items to be measured. However, for example, when all the designated items to be measured cannot be executed, a Resource Status Failure message is transmitted instead of the RESOURCE STATUS RESPONSE message.

As illustrated in FIG. 6, the eNB 2 which has transmitted the RESOURCE STATUS RESPONSE message performs the measurement according to the condition designated by the RESOURCE STATUS REQUEST message, and regularly transmits a RESOURCE STATUS UPDATE message indicating the measured result to the eNB 1.

FIG. 7 is a diagram for explaining IEs of the RESOURCE STATUS REQUEST message. Except for an underlined part of FIG. 7, the IEs are the same as those of a RESOURCE STATUS REQUEST message defined by the 3GPP standards (see, for example, 3GPP TS 36.423 V10.1.0 "9.1.2.11 RESOURCE STATUS REQUEST").

As illustrated in FIG. 7, the RESOURCE STATUS REQUEST message is different in that the remaining power amount information is configured to be able to be designated in Report Characteristics for designating the items to be measured, from a current RESOURCE STATUS REQUEST message.

Specifically, the Report Characteristics is configured as a bit string in which positions of bits are associated with the items to be measured. That is, the first bit corresponds to PRB Periodic, the second bit corresponds to TNL load Ind Periodic, the third bit corresponds to HW Load Ind Periodic, the fourth bit corresponds to Composite Available Capacity Periodic, the fifth bit corresponds to ABS Status Periodic, and the sixth bit corresponds to Battery Status Periodic. Here, the bit (the sixth bit) corresponding to the Battery Status Periodic being "1" corresponds to a request to measure and transmit Battery Status.

Here, the Battery Status corresponds to the remaining power amount information. PRB indicates the number of usage of PRB (Physical Resource Block) which is a unit for assigning a time frequency resource, TNL load Ind indicates a load of a backhaul between the base station and the core network, HW Load Ind indicates a hardware load of the base station, Composite Available Capacity indicates capacity classes which is an index indicating relative communication capacity of the base station and a percentage of available communication capacity among them. Moreover, the RESOURCE STATUS REQUEST message is configured to designate a period at which the report (the transmission) of the measured result is performed by Reporting Periodicity.

FIG. 8 is a diagram for explaining IEs of the RESOURCE STATUS UPDATE message. Except for an underlined part of FIG. 8, the IEs are the same as those of a RESOURCE STATUS UPDATE message defined by the 3GPP standards (see, for example, 3GPP TS 36.423 V10.1.0 "RESOURCE STATUS UPDATE").

As illustrated in FIG. 8, the RESOURCE STATUS UPDATE message includes a Battery Status IE as the remaining power amount information in addition to IEs of a current RESOURCE STATUS UPDATE message.

The RESOURCE STATUS UPDATE message is transmitted for each cell. Thus, when one base station forms a plurality of cells and the different battery 12 is provided in each of the plurality of cells, a different Battery Status IE can be transmitted for each cell.

(1.4) Operation of Mobile Communication System

Next, an operation of the mobile communication system 1 according to the present embodiment will be described. FIG. 9 is an operation sequence diagram of the mobile communication system 1 according to the present embodiment. Hereinafter, a battery provided in the base station 10-1 is called a battery 12-1, and a battery provided in the base station 10-2 is called a battery 12-2. In addition, the base station 10-2 is adjacent to the base station 10-1.

As illustrated in FIG. 9, in step S101, the base station 10-1 measures a remaining power amount of the battery 12-1.

In step S102, the base station 10-1 compares the remaining power amount of the battery 12-1 measured in step S101 with the threshold value A.

In step S103, the base station 10-1 omits the transmission of remaining power amount information indicating the remaining power amount measured in step S101 when the remaining power amount of the base station 10-1 is less than the threshold value A. Specifically, the base station 10-1 does not transmit the Load Information message including the Battery Indication IE, or the Resource Status Update message including the Battery Status IE. Then, the operation returns to the process in step S101.

On the other hand, in step S104, the base station 10-1 transmits the remaining power amount information indicating the remaining power amount measured in step S101, to the base station 10-2 through the X2 interface, when the remaining power amount of the base station 10-1 is equal to or more than the threshold value A. Specifically, the base station 10-1 transmits the Load Information message including the Battery Indication IE, or the Resource Status Update message including the Battery Status IE through the X2 interface. The base station 10-2 receives the remaining power amount information through the X2 interface.

In step S105, the base station 10-2 measures a remaining power amount of the battery 12-2.

In step S106, the base station 10-2 compares the remaining power amount of the battery 12-1 indicated by the remaining power amount information received in step S104, with the remaining power amount of the battery 12-2 measured in step S105. When the remaining power amount of the battery 12-1 (base station 10-1) is equal to or less than the remaining power amount of the battery 12-2 (base station 10-2), the operation returns to the process in step S104.

On the other hand, in step S107, the base station 10-2 performs a process for decreasing a load of the base station 10-2 and for increasing a load of the base station 10-1 when the remaining power amount of the base station 10-1 is more than the remaining power amount of the base station 10-2. For example, the base station 10-2 adjusts an offset value as a handover parameter. The handover parameter is used for determination regarding handover in the base station 10. Alternatively, the handover parameter is notified from the base station 10 to the radio terminal 20, and is used for determination regarding transmission of a measurement report in the radio terminal 20.

Here, a usage example of an offset value according to the present embodiment will be described. When the radio terminal 20 is capable of receiving a radio signal from each of the base station 10-1 and base station 10-2, before received power (hereinafter, RSRP1) corresponding to the base station 10-1 is compared with received power (hereinafter, RSRP2) corresponding to the base station 10-2, an offset value for correcting the RSRP1 to be large is added to the RSRP1. In this way, it is highly probable that the RSRP1 after the offsetting exceeds the RSRP2. Thus, the base station 10-1 is preferentially selected as a connection destination (handover destination) as compared with the base station 10-2, and the coverage of the base station 10-1 can be expanded while the coverage of the base station 10-2 can be decreased. In addition, in order to avoid unnecessary handover, an offset value is shared by a pair of the adjacent base stations 10.

In step S108, the base station 10-2 transmits a Mobility Change Request message including the offset value determined in step S107, to the base station 10-1 through the X2 interface. The base station 10-1 receives the Mobility Change Request message including the offset value through the X2 interface.

In step S109, the base station 10-1 transmits a Mobility Change Acknowledge message which is a positive response to the Mobility Change Request message, to the base station 10-2 through the X2 interface. The base station 10-2 receives the Mobility Change Acknowledge message through the X2 interface.

In step S110, the base station 10-2 sets the offset value as a handover parameter. In step S111, the base station 10-1 sets the offset value as a handover parameter, which is included in the Mobility Change Request message received in step S109.

(1.5) Effects of First Embodiment

As described above, according to the present embodiment, when the remaining power amount of the battery 12-1 provided in the base station 10-1 is equal to or more than the threshold value A (that is, when the remaining power amount of the battery 12-1 is large), it is possible to prompt the redirection of the load of the base station 10-2 to the base station 10-1 by transmitting the remaining power amount information from the base station 10-1 to the base station 10-2. Therefore, the present embodiment is effective for the case in which, for example, the remaining power amount of the battery 12-2 provided in the base station 10-2 is estimated to be small.

On the other hand, the base station 10-1 does not have enough margin to absorb the load of the base station 10-2 when the remaining power amount of the battery 12-1 provided in the base station 10-1 is less than the threshold value A (that is, the remaining power amount of the battery 12-1 is small). Therefore, it is possible to prevent signaling between the base station 10-1 and base station 10-2 (traffic between the base station 10-1 and base station 10-2) by not transmitting the remaining power amount information to the base station 10-2.

In the present embodiment, when the remaining power amount of the battery 12-2 provided in the base station 10-2 is less than the remaining power amount of the battery 12-1 provided in the base station 10-1, the base station 10-2 performs a process for increasing the load of the base station 10-1 and for decreasing the load of the base station 10-2. In this way, it is possible to redirect the load of the base station 10-2 to the base station 10-1, and thus, it is possible to reduce power consumption of the base station 10-2. Accordingly, it is possible to prevent a problem, in which communication is disabled by a deficit of the remaining power amount of the battery 12-2 provided in the base station 10-2, from occurring.

Furthermore, by adding the IEs of the remaining power amount information to the message defined by the 3GPP standards without defining a new message, it is possible to maintain compatibility with the current standard.

(2) Second Embodiment

In a second embodiment, the configuration of the mobile communication system 1 is similar to that of the first embodiment, but the operation of the mobile communication system 1 is different from that of the first embodiment.

(2.1) Operation of Mobile Communication System

Figure 10:
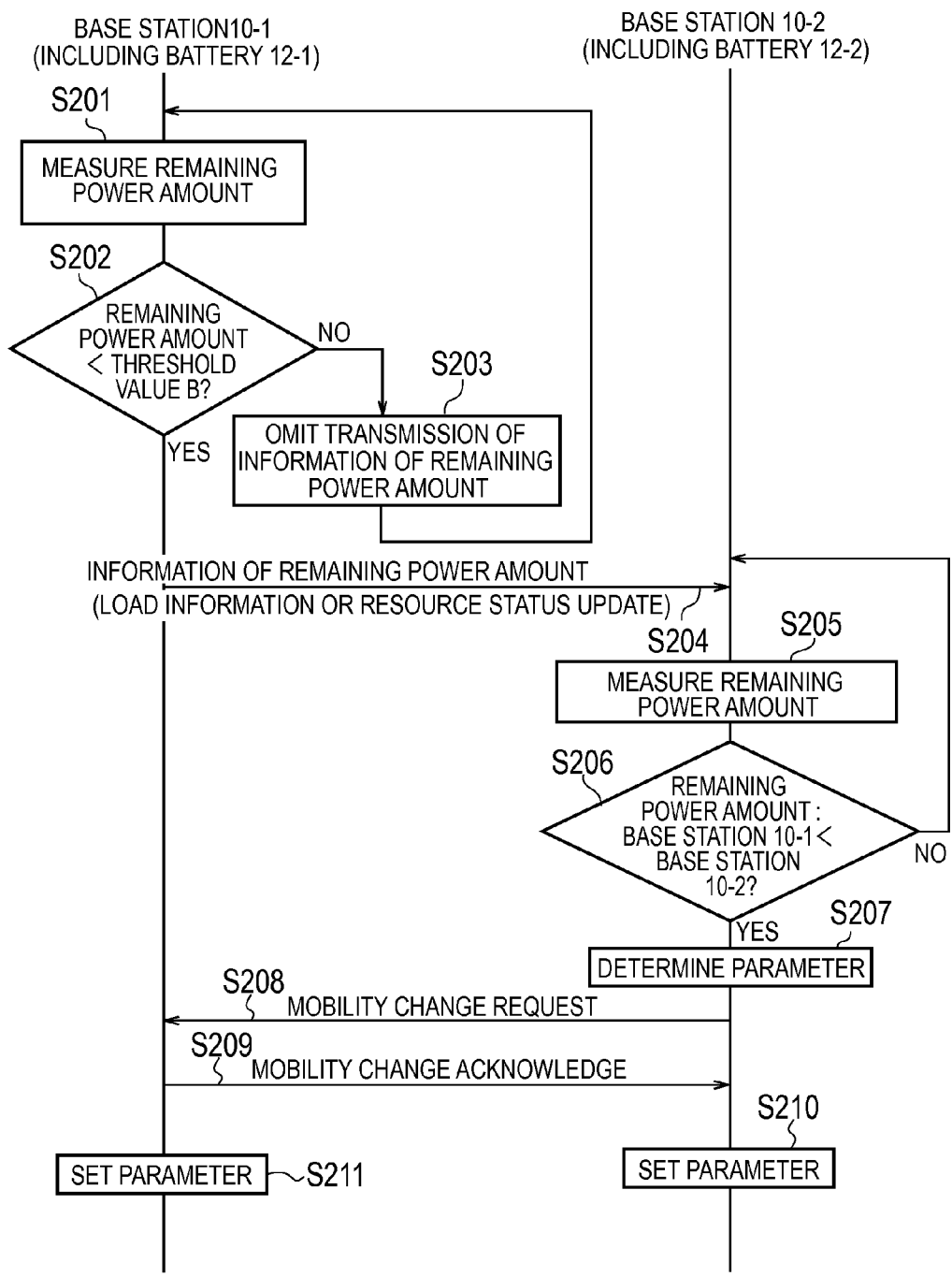
FIG. 10 is an operation sequence diagram of the mobile communication system according to the second embodiment.

FIG. 10 is an operation sequence diagram of the mobile communication system 1 according to the present embodiment.

As illustrated in FIG. 10, in step S201, the base station 10-1 measures a remaining power amount of the battery 12-1.

In step S202, the base station 10-1 compares the remaining power amount of the battery 12-1 measured in step S201 with a threshold value B. In the present embodiment, the threshold value B is a value equal to or slightly higher than a lower limit value indicating an overdischarge of the battery 12-1.

In step S203, the base station 10-1 omits the transmission of remaining power amount information indicating the remaining power amount measured in step S201 when the remaining power amount of the base station 10-1 is equal to or more than the threshold value B. Specifically, the base station 10-1 does not transmit the Load Information message including the Battery Indication IE, or the Resource Status Update message including the Battery Status IE. Then, the operation returns to the process in step S201.

On the other hand, in step S204, the base station 10-1 transmits the remaining power amount information indicating the remaining power amount measured in step S201, to the base station 10-2 through the X2 interface, when the remaining power amount of the base station 10-1 is less than the threshold value B. Specifically, the base station 10-1 transmits the Load Information message including the Battery Indication IE, or the Resource Status Update message including the Battery Status IE through the X2 interface. The base station 10-2 receives the remaining power amount information through the X2 interface.

In step S205, the base station 10-2 measures a remaining power amount of the battery 12-2.

In step S206, the base station 10-2 compares the remaining power amount of the battery 12-1 indicated by the remaining power amount information received in step S204, with the remaining power amount of the battery 12-2 measured in step S205. When the remaining power amount of the battery 12-1 (base station 10-1) is equal to or more than the remaining power amount of the battery 12-2 (base station 10-2), the process returns to the process in step S204.

On the other hand, in step S207, the base station 10-2 performs a process for decreasing a load of the base station 10-1 and for increasing a load of the base station 10-2 when the remaining power amount of the base station 10-1 is less than the remaining power amount of the base station 10-2. For example, the base station 10-2 adjusts an offset value as a handover parameter. The handover parameter is used for determination regarding handover in the base station 10. Alternatively, the handover parameter is notified from the base station 10 to the radio terminal 20, and is used for determination regarding transmission of a measurement report in the radio terminal 20.

Here, a usage example of an offset value according to the present embodiment will be described. When the radio terminal 20 is capable of receiving a radio signal from each of the base station 10-1 and base station 10-2, before received power (hereinafter, RSRP1) corresponding to the base station 10-1 is compared with received power (hereinafter, RSRP2) corresponding to the base station 10-2, an offset value for correcting the RSRP2 to be large is added to the RSRP2. In this way, it is highly probable that the RSRP2 after the offsetting exceeds the RSRP1. Thus, the base station 10-2 is preferentially selected as a connection destination (handover destination) as compared with the base station 10-1, and the coverage of the base station 10-2 can be expanded while the coverage of the base station 10-1 can be decreased. In addition, in order to avoid unnecessary handover, an offset value is shared by a pair of the adjacent base stations 10.

In step S208, the base station 10-2 transmits a Mobility Change Request message including the offset value determined in step S207, to the base station 10-1 through the X2 interface. The base station 10-1 receives the Mobility Change Request message including the offset value through the X2 interface.

In step S209, the base station 10-1 transmits a Mobility Change Acknowledge message which is a positive response to the Mobility Change Request message, to the base station 10-2 through the X2 interface. The base station 10-2 receives the Mobility Change Acknowledge message through the X2 interface.

In step S210, the base station 10-2 sets the offset value as a handover parameter. In step S211, the base station 10-1 sets the offset value as a handover parameter, which is included in the Mobility Change Request message received in step S209.

(2.2) Effects of Second Embodiment

As described above, according to the present embodiment, when the remaining power amount of the battery 12-1 provided in the base station 10-1 is less than the threshold value B (that is, when the remaining power amount of the battery 12-1 is small), it is possible to prompt the redirection of the load of the base station 10-1 to the base station 10-2 by transmitting the remaining power amount information from the base station 10-1 to the base station 10-2. Therefore, the present embodiment is effective for the case in which, for example, the remaining power amount of the battery 12-2 provided in the base station 10-2 is estimated to be large.

On the other hand, the necessity for the base station 10-2 to absorb the load of the base station 10-1 is low when the remaining power amount of the battery 12-1 provided in the base station 10-1 is equal to or more than the threshold value B (that is, the remaining power amount of the battery 12-1 is large). Therefore, it is possible to prevent signaling between the base station 10-1 and base station 10-2 (traffic between the base station 10-1 and base station 10-2) by not transmitting the remaining power amount information to the base station 10-2.

In the present embodiment, the base station 10-2 performs a process for decreasing the load of the base station 10-1 and for increasing the load of the base station 10-2 when the remaining power amount of the battery 12-2 provided in the base station 10-2 is more than the remaining power amount of the battery 12-1 provided in the base station 10-1. In this way, it is possible to redirect the load of the base station 10-1 to the base station 10-2, and thus, it is possible to reduce power consumption of the base station 10-1. Accordingly, it is possible to prevent a problem, in which communication is disabled by a deficit of the remaining power amount of the battery 12-1 provided in the base station 10-1, from occurring.

Other Embodiments

As described above, the present invention has been described according to the embodiments. It must not be understood that the discussions and the drawings constituting a part of this disclosure limit the present invention. From this disclosure, various alternative embodiments, examples and operational techniques are apparent to those skilled in the art.

For example, in the aforementioned first embodiment, when the remaining power amount of the base station 10-1 is less than the threshold value A, the base station 10-1 controls so as not to transmit the Load Information message including the remaining power amount information, or the Resource Status Update message including the remaining power amount information. However, as well as such a comparison with the threshold value A, when the remaining power amount of the base station 10-1 shows a rapid decrease (the decrease of the remaining power amount within a unit time exceeds a predetermined amount), the base station 10-1 may control so as not to transmit the Load Information message including the remaining power amount information, or the Resource Status Update message including the remaining power amount information, by predicting a deficit of the remaining power amount in the near future.

The aforementioned embodiment has described an example in which the messages are transmitted and received through the X2 interface. However, the messages may be transmitted and received through the S1 interface. In such a case, the MME may relay the messages transmitted and received between the base stations 10.

Note that the entire content of the Japanese Patent Application No. 2011-151592 (filed on Jul. 8, 2011) is incorporated herein by reference.

INDUSTRIAL APPLICABILITY

As described above, the present invention is useful in radio communication such as mobile communication, with which it is possible to perform load distribution control among base stations with taking into account a circumstance of a battery.

The invention claimed is:

1. A communication control method in a mobile communication system that includes a base station that is provided with a battery and that is capable of being driven by power supplied from the battery, comprising:
a transmission control step of controlling, by the base station, transmission of remaining power amount information from the base station to another base station, wherein
the remaining power amount information indicates a remaining power amount of the battery, and
the transmission control step controls the transmission of the remaining power amount information from the base station to the other base station in accordance with the remaining power amount of the battery, wherein the transmission control step comprises:
a step of controlling so as to transmit the remaining power amount information to the other base station when the remaining power amount of the battery is equal to or more than a first threshold value or when the remaining power amount of the battery is less than a second threshold value; and
a step of controlling so as not to transmit the remaining power amount information to the other base station when the remaining power amount of the battery is less than the first threshold value or when the remaining power amount of the battery is equal to or more than the second threshold value.

2. The communication control method according to claim 1, further comprising:
a reception step of receiving, by the other base station, the remaining power amount information from the base station; and
a load adjustment step of performing, by the other base station, a process for increasing a load of the base station and for decreasing a load of the other base station when a remaining power amount of a battery provided in the other base station is less than the remaining power amount indicated by the remaining power amount information received in the reception step.

3. The communication control method according to claim 1, further comprising:
a reception step of receiving, by the other base station, the remaining power amount information from the base station; and
a load adjustment step of performing, by the other base station, a process for decreasing a load of the base station and for increasing a load of the other base station when a remaining power amount of a battery provided in the other base station is more than the remaining power amount indicated by the remaining power amount information received in the reception step.

4. The communication control method according to claim 1, wherein the base station forms a plurality of cells and a different battery is used for each cell, wherein a different remaining power amount message is transmitted from the base station to the other base station for each cell.

5. A base station that is provided with a battery and capable of being driven by power supplied from the battery, comprising:
a transmitter configured to transmit remaining power amount information indicating a remaining power amount of the battery to another base station; and a controller configured to control the transmission of the remaining power amount information to the other base station in accordance with the remaining power amount of the battery, wherein the controller controls so as to transmit the remaining power amount information to the other base station when the remaining power amount of the battery is equal to or more than a first threshold value or when the remaining power amount of the battery is less than a second threshold value; and the controller controls so as not to transmit the remaining power amount information to the other base station when the remaining power amount of the battery is less than the first threshold value or when the remaining power amount of the battery is equal to or more than the second threshold value.

6. The base station according to claim 5, wherein the base station forms a plurality of cells and a different battery is used for each cell, wherein a different remaining power amount message is transmitted from the base station to the other base station for each cell.

\* \* \* \* \*